United States Patent [19]

Legille

[11] 3,905,239
[45] Sept. 16, 1975

[54] TRAILING GAUGE

[75] Inventor: Edouard Legille, Grand Duchy of Luxembourg, Luxemburg

[73] Assignee: S.A. des Anciens Etablissements Paul Wurth, Grand Duchy of Luxembourg, Luxemburg

[22] Filed: Dec. 5, 1973

[21] Appl. No.: 421,753

Related U.S. Application Data

[62] Division of Ser. No. 308,800, Nov. 22, 1972, Pat. No. 3,816,932.

[52] U.S. Cl. .................. 73/432 R; 73/291; 73/343; 73/421.5 A
[51] Int. Cl.² ......................................... G01N 1/22
[58] Field of Search .... 73/421.5 R, 421.5 A, 343 R, 73/291, 292; 33/174 L, 174 P, 125 T

[56] References Cited
UNITED STATES PATENTS

| 1,809,324 | 6/1931 | Austin | 73/421.5 A |
| 2,906,179 | 9/1959 | Boaer | 33/1 CC |
| 2,997,878 | 8/1961 | Graham | 73/292 |
| 3,140,610 | 7/1964 | Lanham | 33/126.6 |
| 3,561,125 | 2/1971 | Zeidler | 33/174 L |
| 3,594,909 | 7/1971 | Schultz | 33/125 T |
| 3,643,508 | 2/1972 | Schneider | 73/421.5 A |
| 3,714,715 | 2/1973 | Coes | 33/174 R |

*Primary Examiner*—S. Clement Swisher

[57] ABSTRACT

A method of and apparatus for scanning the surface of a charge of material in a shaft furnace in order to provide information as to the charging plane profile. The apparatus includes a gauge device which may be inserted into the furnace to a predetermined position, contact thereupon established with the charge surface and the device thereafter withdrawn from the furnace while maintaining contact with the surface and simultaneously measuring the degree of extension of the device into the furnace and the angle between the surface contacting portion of the device and horizontal. In order to determine the complete charge profile a plurality of the gauge devices are employed.

19 Claims, 9 Drawing Figures

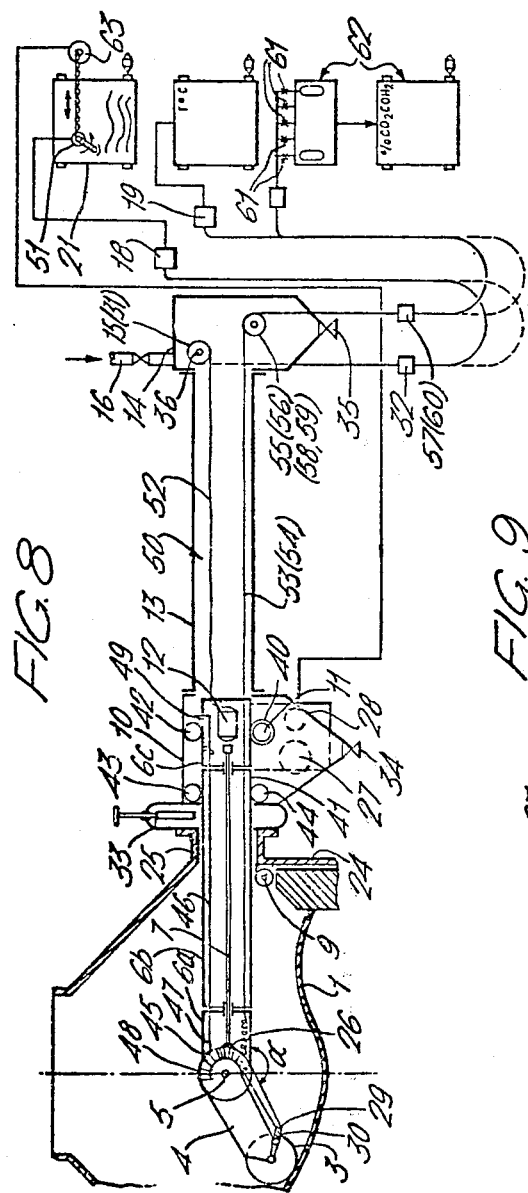
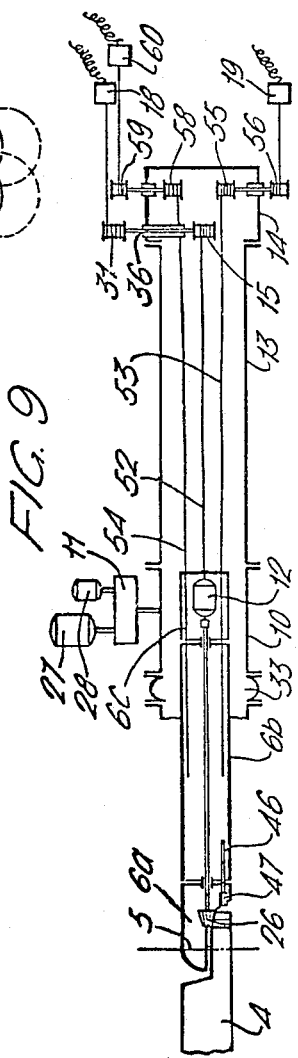
FIG. 8
FIG. 9

TRAILING GAUGE

CROSS-REFERENCE TO RELATED APPLICATIONS:

This application is a division of application Ser. No. 308,800 filed Nov. 22, 1972. Application Ser. No. 308,800, which has been issued as U.S. Pat. No. 3,816,932, was entitled to the Jan. 18, 1972 filing date of Luxembourg Application No. 64,587 and this application is similarly entitled to the filing date of Luxembourg Application No. 64,587.

BACKGROUND OF THE INVENTION:

1. Field of the Invention

The present invention relates to the measurement of the contour of a surface from a position located remotely of the surface. More specifically, this invention is directed to apparatus for measuring of the profile of the charging plane in a shaft furnace and particularly in a blast furnace. Accordingly, the general objects of the present invention are to provide novel and improved methods and apparatus of such character.

2. Description of the Prior Art

While not limited thereto in its utility, the present invention has been found to be particularly well suited for use with smelting apparatus of the type employed in the steel industry. In recent years substantial improvements have been made in the techniques of and equipment for performing smelting processes in blast furnaces; the improvements resulting in manufacturing economies and enhanced product quality and uniformity. These improvements in technique and apparatus have, however, imposed demands on the control of furnace operations which are considerably more exacting than those previously encountered. It is envisioned that future blast furnace processes will require fully automatic control if maximum efficiency is to be realized. The need for complete automation is and will be particularly great in the operation of large scale blast furnaces; the trend in the industry being the constant increase in furnace size. As furnace size increases it becomes more difficult to detect process abnormalities at their inception and, in order to insure the desired quality of the product, it is mandatory that troubles be detected at an early stage. Thus, in order to operate a furnace along a rectilinear set-value curve in the optimum manner, all critical parameters must be sensed and controlled and troubles or deviations from the optimum set-value curve must be detected and displayed immediately upon occurrence.

One of the critical steps in the operation of a blast furnace is the feeding of the furnace with the raw materials; this step being known as the charging process. Prior art charging devices typically employed furnace top bells which are inherently unable to distribute their burden of raw material evenly over the entire furnace charging surface. Thus, in the prior art the charge profile formed beneath the furnace top bell had a characteristic M-curve which, while generally undesirable, could not be eliminated.

U.S. Pat. No. 3,693,812 to R. Mahr et al. and assigned to the assignee of the present invention describes an improved furnace charge feeding apparatus which enables the charge of raw materials to be distributed in any arbitrary desired manner, including evenly across the charging plane, over the entire cross-section of a blast furnace. Similarly, Luxembourg Pat. No. 64,910, filed by the present applicant, describes a proportioning apparatus which enables the exercise of control over the furnace parameter of "charge per unit of time." The apparatus of Luxembourg Pat. No. 64,910 operates by continuously weighing the load to be delivered to a feed and distribution device, for example the device of aforementioned U.S. Pat. No. 3,693,812, during the charging process. The proportioning apparatus, in combination with the distributing device, represents an important step towards optimizing blast furnace operation.

To briefly review the preceding remarks, modern blast furnace operating techniques require, as critical steps, the proper preparation of the charge burden and its careful distribution over the entire blast furnace cross-section. To enable the charging or feeding process to be controlled in the interest of achieving either uniform distribution or a predetermined charge profile, means for measuring the profile of the charging plane is required. Thus, in the interest of achieving constant charge height and making it possible to perform small charge distribution corrections, a gauge apparatus for sensing and accurately providing information concerning the profile of the charging plane over its entire cross-section is necessary.

Various devices have been employed in the prior art in an attempt to determine the profile of a blast furnace charging plane. These prior art profile sensing devices have included mechanical "feelers" oriented vertically and distributed over the furnace cross-section. Attempts have also been made to employ horizontally oriented radiation sources and associated detectors mounted about the periphery of the furnace. The prior art sensing devices, however, have only provided the furnace operator with information regarding charge height at a number of spacially displaced points. Such information, at best, allows only an estimate of actual charge profile and certainly does not permit a plotting of the profile over the entire furnace cross-section.

It is to be noted that profile scanning devices employing transmitted beams of energy have also been suggested. Such scanning devices have included infrared, ultrasonic and nuclear radiation sources and an associated receiver. Profile scanning devices employing radiated energy have, in the few cases where tried, proved to be unsuccessful due to their lack of reliability in the extreme environment of a blast furnace and also due to measuring inaccuracies caused by the presence of flue dust.

SUMMARY OF THE INVENTION

The present invention overcomes the above discussed and other deficiencies and disadvantages of the prior art by providing novel and improved methods and apparatus for sensing the profile of an inaccessible surface and providing information commensurate with the sensed profile. In accomplishing these objectives, the present invention contemplates an electromechanical gauge device, said device being characterized by durability and ruggedness, which will enable the charging plane of a shaft furnace to be scanned over the entire furnace cross-section when employed with a plurality of similar gauge devices. Thus, apparatus in accordance with the present invention possesses the capability of measuring differences in height of a surface and transmitting the height measurements to a remote location where they may be employed to automatically control a charging process whereby the height of the surface being measured with respect to a predetermined plane may be caused to assume a desired contour.

In accordance with the present invention a gauge device including a horizontally movable gauge arm is provided. The horizontally movable arm may be mounted at the head of a blast furnace and has, at its inwardly disposed end, a vertically rotatable swing arm. The free end of the swing arm will be caused to slide over the surface of the furnace charge, during horizontal movement of the gauge arm, and the swing arm will thus scan the profile of the charging plane. The gauge device also includes sensor-transmitter devices which provide signals commensurate with the horizontal position of the gauge arm and the angle assumed by the swing arm with respect to the gauge arm; these signals enabling the calculation of charging plane profile.

In accordance with a preferred embodiment of the invention the novel gauge device or devices are mounted within a pressure proof protective housing or housings; the interior of each said housing being at furnace pressure during operation. Accordingly, the present invention is suitable for use in modern blast furnaces which operate with considerable counter-pressure adjacant the top of the furnace.

Also in accordance with the invention, if deemed desirable or necessary, the gauge device or devices may be provided with gas extraction apertures and/or temperature sensors for use in the measuring of furnace conditions other than charging plane profile

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 8 is a cross-sectional side elevation view schematically illustrating a preferred embodiment of a gauge device in accordance with the present invention, FIG. 8 revealing additional detail of the embodiment of FIG. 1; and FIG. 9 is a cross-sectional top view of the apparatus of FIG. 8.

DESCRIPTION OF THE PREFERRED EMBODIMENT

Figure 1:
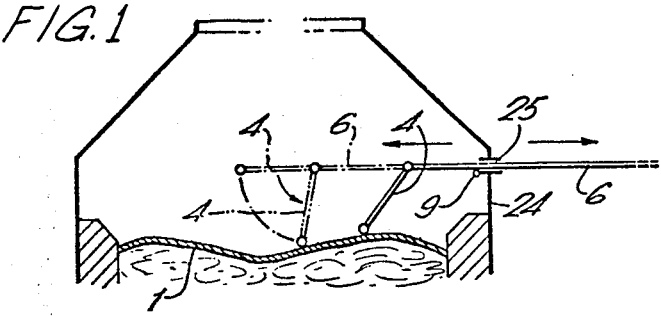
FIG. 1 schematically illustrates a preferred embodiment of a gauge device in accordance with the present invention.

With reference now to FIG. 1, the upper portion of a conventional blast furnace is shown schematically. In the furnace of FIG. 1 the charging plane; i.e., the contour of the upper surface of the charge of raw material which has been delivered to the furnace; is indicated in exaggerated fashion by a plane 1 having a finite thickness. As noted above, in the interest of maximizing the efficiency of operation of and the quality of the product produced by the furnace, it is desired to determine as accurately as possible, and in a single operation, the course or profile of the curve defined by charging plane 1 over the furnace cross-section. In accordance with the invention, and in order to permit the measurement of the profile curve, the head of the blast furnace is provided with a gauge; this gauge hereinafter being referred to as a trailing gauge.

The trailing gauge of the present invention comprises a horizontally movable gauge arm 6 and a swing arm 4. The gauge arm 6 may be moved in and out of the furnace via an aperture 25 in furnace wall 24. As will be explained below in greater detail, the swing arm 4 is capable of oscillation in the vertical direction, about the end of gauge arm 6, and is capable of sliding freely over the surface or profile of charging plane 1. Accordingly, the free end of swing arm 4 continuously scans the profile of the charging plane during the horizontal movement of gauge arm 6. During the movement of gauge arm 6, accordingly, both the longitudinal position thereof and the particular angular position with respect thereto assumed by swing arm 4 may be sensed in the interest of providing output signals which are together commensurate with the charging plane profile curve.

Figure 2:
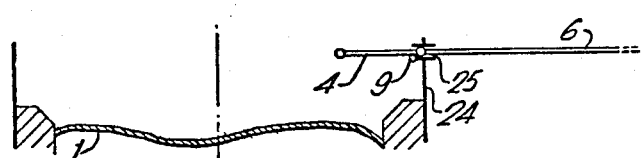
FIGS 2–7 schematically depict the positions through which the gauge device of FIG. 1 will move during a charging plane profile measuring process.
Figure 3:
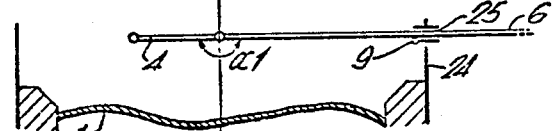
Figure 4:
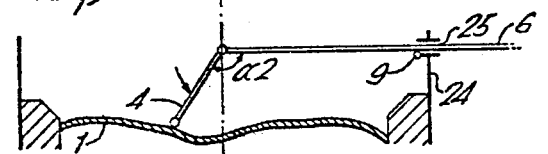
Figure 5:
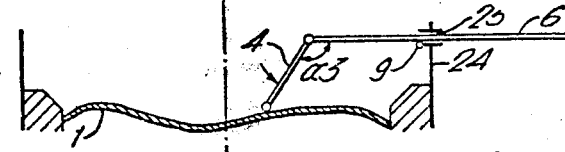
Figure 6:
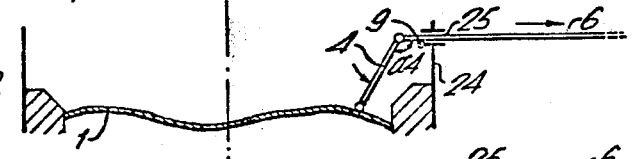

FIGS. 2–7 depict schematically the several steps by means of which a profile curve measurement may be made employing the apparatus of FIG. 1. FIG. 2–7 shows an initial position of the trailing gauge wherein gauge arm 6 and swing arm 4 are horizontally aligned. As the trailing gauge is introduced further into the furnace, as depicted in FIG. 2b, the swing arm is maintained in the horizontal position, by means which will be described below, whereby the angle $\angle \alpha$ between swing arm 4 and gauge arm 6 is 180°. When the inner end of gauge arm 6 reaches the central axis of the furnace, swing arm 4 is released and drops down into contact with the charging plane as shown in FIG. 4. After the swing arm has been brought into contact with the charging plane, the gauge arm 6 is extracted from the furnace. During withdrawal of the gauge arm the swing arm 4 will be caused to move over the charging plane, in constant contact therewith, so that the free end of arm 4 continuously scans the profile 1 of the charging plane. The angle $\angle \alpha$ between the swing arm and gauge arm will, accordingly, pass through values corresponding to the charging plane profile. FIGS. 4, 5 and 6 depict the intermediate values $\angle \alpha^2$, $\angle \alpha^3$, and $\angle \alpha^4$ of angle $\angle \alpha$. When the junction between gauge arm 6 and swing arm 4 reaches the furnace wall, swing arm 4 of the trailing gauge is caused to resume its original horizontal position so that the entire trailing gauge apparatus can be removed from the furnace.

During the withdrawal operation; i.e., the operation depicted in FIGS. 4–6; the position of the trailing gauge in the interior of the furnace and the angular position or movement of swing arm 4 with respect to horizontal gauge arm 6 are sensed and signals commensurate with the sensed positions are transmitted to recording apparatus which provides a plot of the thus measured profile curve. The further charging of the furnace may then be controlled, as regards to the charging surface profile curve measured, in order to balance out any uneven places shown in the profile curve plot.

It will be understood, although FIGS. 1 and 2 only depict the introduction of the trailing gauge to the center axis of the furnace, that it is possible to extend the horizontal gauge arm 6 beyond the furnace center. Similarly, while only vertical movement of swing arm 4 has been described, if deemed desirable the swing arm can be caused to rotate both horizontally and vertically about the end of gauge arm 6.

It is particularly to be noted that it is of advantage to provide a number of the trailing gauges of the present invention, arranged about the periphery of the furnace, in order to measure the overall profile of the charging plane. It may also be desirable to install trailing gauges at different levels at the head of the furnace so that the charging plane profile can be measured at heights which cannot be reached by a single array of gauges.

FIGS. 8 and 9 show the preferred embodiment of the trailing gauge of the present invention in further detail. The gauge arm is comprised of three separate parts indicated at 6a, 6b and 6c. As noted above, the gauge arm may be extended into the interior of the furnace through an aperture 25 in the side wall 24 of the furnace. The horizontal insertion and retraction of gauge arm is accomplished by means of a suitable drive indicated schematically at 27. A gear wheel 40 of a drive train 11 connected to drive 27 engages a rack 41 affixed to the gauge arm in order to translate the rotational drive to horizontal motion of the gauge arm. The particular position occupied by the gauge arm is detected by a Selsyn transmitter 28 associated with the drive train; Selsyn transmitter 28 generating an electrical signal commensurate with the position of the end of the gauge arm within the furnace. The gauge arm is guided during its movements by means of guide rollers 42, 43 and 44. The horizontal movements of the gauge arm are limited in the conventional manner by limit switches which have been omitted from the drawing in the interest of facilitating understanding of the invention.

The swing arm 4 is connected, via a swivel joint 5, to end portion 6a of the gauge arm. The free end of the swing arm 4 is provided with a sliding surface, typically in the form of a roller 3, which will slide or otherwise move over the charging profile plane 1 during the withdrawal movement of the trailing gauge. The particular angular position α of swing arm 4 with relation to the horizontal; i.e., the angle between the gauge arm and swing arm 4; will be indicated by the rotational position of a gear member 45 affixed to swivel joint 5. The position of the gear portion 45 of swivel joint 5 will be transmitted, via a bevel gear 26 and associated rotatable shaft 7, to a second Selsyn transmitter 12.

In the idle position and when the trailing gauge is being inserted into the furnace the swing arm 4 is held in the horizontal position shown in FIGS. 2 and 3 by a mechanical latching device comprised of a bar 46 having a claw 47 at a first end thereof and a stop member 49 at the second end thereof. The claw 47 engages a catch 48 on swivel joint 5 during insertion until the stop 49 of bar 46 encounters guide roller 42. Further forward movement of gauge arm 6 will result in disengagement of claw 47 from catch 48 thereby permitting the swing arm 4 to descend to the position shown in FIGS. 4 and 8 under its own weight. It will, of course, be understood that swing arm 4 can be secured and released by numerous other techniques including a manually operated latch means or magnetic latching means.

The rotatable information transmitting shaft 7 and latching bar 46 may be mounted either inside or outside of the horizontally movable gauge arm; the preferable position being with shaft 7 and bar 46, together with various conductors and conduits which will be described below, enclosed within the gauge arm. Thus, in accordance with the preferred embodiment of the invention, the gauge arm is hollow in the interest of protecting the components disposed therein against the high temperatures prevailing in the head of the blast furnace.

Figure 7:
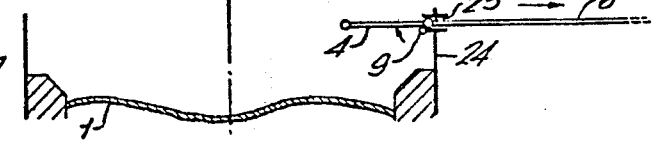

With reference to FIGS. 6 and 7 in conjunction with FIGS. 8 and 9, it will be observed that a guide roller 9 affixed to the inside of wall 24 of the furnace is employed to return swing arm 4 to the horizontal position at the end of the trailing gauge extraction stroke. The raising of swing arm 4, of course, is delayed until the extraction of the gauge arm is nearly completed so that the measuring operation will cover substantially the entire profile of the charging plane.

As will be obvious to those skilled in the art, the design and weight of swing arm 4 and the speed at which the trailing gauge is withdrawn from the furnace are all selected to insure that none of the charge material will be dammed up behind the portion 3 of swing arm 4 which contacts the charge during the extraction movement.

Externally of the furnace the trailing gauge is isolated from the ambient atmosphere by a pressure-proof protective housing 50; protective housing 50 being comprised of portions 10, 13 and 14. The guide and drive mechanisms for the trailing gauge are enclosed within portion 10 of housing 50, portion 13 of the housing is elongated to receive the trailing gauge and portion 14 of housing 50 forms a protective enclosure for a drum box. The three portions of housing 50 are rigidly interconnected, preferably in a detachable but pressure-proof manner, and the entire protective housing 50 is affixed to the wall 24 of the furnace and supported, if necessary, on supporting structure which has been omitted from the drawing in the interest of clarity. It is to be noted that a slide valve 33 is provided on housing 50 thereby permitting the trailing gauge to be completely withdrawn for purposes of maintenance; the aperture 25 in the furnace wall 24 being sealed in a gas-tight manner by valve 33 after withdrawal of the trailing gauge.

In the interest of minimizing contamination of the trailing gauge, and particularly in order to keep the housing 50 free of dust, a gas such as nitrogen or cooled and purified stack gas is blown into housing 50 through a connector 16. If flue dust nevertheless accummulates in the trailing gauge housing, dust can from time to time be removed through a pair of discharge valves 34 and 35 provided for this purpose. In addition to the cooling as, it is also of advantage to inject a lubricating liquid into protective housing 50 in the interest of providing the individual moving parts with the necessary lubrication.

As discussed above, the angular position of swing arm 4 and the degree of extension of the gauge arm into the furnace are respectively sensed by Selsyn transmitters 12 and 28. The signals provided by Selsyn transmitter 12 and 28 are thus commensurate with the vertical and horizontal position of swing arm 4. The Selsyn transmitter 28 is electrically connected to a Selsyn receiver 63 which, in turn, is connected to a recording apparatus 21. Similarly Selsyn transmitter 12 is connected, by means of a heat-resistant electrical cable 52 situated inside protective housing 50, to Selsyn receiver 51. Receiver 51 is also connected to recorder 21. Selsyn receivers 51 and 63 provide electrical signals for controlling the movements of the pen of profile recorder 21 whereby the profile of the charging plane is accurately reproduced during each measuring operation.

During withdrawal of the trailing gauge the transmission cable 52 of Selsyn transmitter 12 will be wound up onto a drum 15 located inside drum box portion 14 of protective housing 50. The drum 15 is mounted for rotation with a hollow shaft 36 which passes through the wall of drum box enclosure 14. A further drum 31 is mounted on shaft 36 externally of casing 50 as shown in FIG. 4. Cable 52 extends past drum 15 through shaft 36 and is wound about the external drum 31. External drum 31 is caused to rotate oppositely to the direction of rotation of internal drum 15 whereby cable 52 is wound into drums 15 and 31 in the opposite directions; the position of the external cable with the trailing gauge extended and retracted being respectively shown in solid and broken lines in FIG. 8. A counter-weight 32 is suspended on cable 52 externally of housing 50 in the interest of causing the cable to be wound off and held taunt on the outer drum 31 during the withdrawal of the trailing gauge; counter-weight 32 also causing the rotation of drum 15 and the winding of the cable onto inner drum 15. During the insertion of the trailing gauge into the furnace the cable on outer drum 31 is wound up as the cable is wound off the inner drum 15. The sealing and supporting system for the passage of shaft 36 through the wall of drum box portion 14 of protective housing 50 is in accordance with well known techniques. Accordingly, although the furnace pressure prevails inside of housing 50, the point at which cable 52 emerges from the protective housing is rendered hermetic by sealing of the cable inlet and outlet points on drums 15 and 31. The cable 52 is electrically coupled from drum 31 to Selsyn receiver 51 of recorder 21 via a cable connector 18.

Should it be deemed necessary or desirable, the trailing gauge of the present invention may be employed to facilitate temperature measurements and gas analysis within the furnace. Thus, a temperature sensor 29 and a gas extraction aperture 30 may be provided on swing arm 4 in the interest of determining the furnace temperature distribution and $CO_2$ content of the flue gas. Temperature distribution and flue gas $CO_2$ content are important indications of the manner in which the furnace is operating and these parameters may vary even if the charge is distributed uniformly over the entire furnace cross-section.

The temperature sensor 29 is connected to a temperature recorder by means of a heat resistant cable 53 situated on or inside of swing arm 4. Cable 53 will pass through hollow gauge arm 6 and, via an inner drum 55 and an outer drum 56, to the temperature recorder. As may be seen from FIGS. 3 and 4, the means by which cable 53 penetrates the protective housing 50 will be the same as that employed with cable 52; there being a counter-weight 57 suspended from cable 53 and connection to the recorder being via an external cable connector 19.

The gas extraction aperture 30 is connected, by means of a suitable thermally resistant hose or other conduit 54, to takeup and delivery drums 58 and 59 respectively. A counter-weight 60 is suspended from the hose 54 externally of housing 50 and the hose is connected, via shut-off valves 61, to a gas analyzer and storage unit indicated generally at 62. It will be understood that the hose or conduit 54 can be replaced within arms 4 and 6 of the trailing gauge by internal borings in structural elements of the gauge. The hose 54 penetrates the wall of drum box portion 14 of housing 50 in a similar manner to that employed for cable 52.

While mechanical transmission of the angle $\alpha$ has been shown and described, it will be understood that various other means for sensing the relationship between swing arm 4 and the gauge arm may be employed. Thus, by way of example, the transmission of the angle $\alpha$ may be effected by means of an analog converter mounted on swivel joint 5. The analog converter may, also by way of example, consist of a rotary potentiometer suitably protected from the high temperatures prevailing in the interior of the furnace. Should a potentiometer be so employed, the movable center tap thereon will be directly connected or coupled to swing arm 4 and will move therewith.

While the above discussion of the operation of the present invention has emphasized the continuous scanning of the charging plane profile, it is to be understood that the charging plane may be scanned or measured at separate points with the gauge being moved into and out of the furnace intermittently. If the charge height is measured at a series of separate points the separate measurements may, after integration, be employed to predict the course of the charging plan profile.

Although the trailing gauge of the present invention may be added into existing blast furnaces and remotely controlled through manually generated commands, the invention is particularly well suited for operation in completely automatic fashion. Thus, by way of example, the intermittent scanning of the charging plane profile may be carried out automatically between two separate feed operations in accordance with a preselected program with the relevant measuring results employed to control a further charging step. The present invention thus provides the blast furnace operator with a reliable and fully automated measuring instrument which enables accurate charging plane profile measurements and, in addition, the invention may provide the operator with temperature and flue gas measurements which can be utilized for either automatic charging or for the complete automation of the smelting process.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for taking measurements at an inaccessible surface having a variable contour comprising:
    gauge arm means:
    means supporting said gauge arm means for movement axially along a line lying in a plane disposed above the surface to be measured;
    means for sensing the position of a point on said gauge arm means with respect to a point on the surface to be measured and for generating a signal commensurate with said sensed position;
    swing arm means pivotally attached to said gauge arm means, said swing arm means being rotatable relative to a plane disposed above the said surface and containing said line, a first end of said arm means contacting the surface to be measured;

means for sensing the angle between said swing arm means and said plane during movement of said gauge arm means and for generating a signal commensurate with said angle whereby the contour of the surface may be determined by combining information commensurate with the position of said swing arm means first end provided by said signals generated by said position and angle sensing means;

means on said swing arm means for sensing a dynamic condition at the surface being measured; and means transmitting information commensurate with said sensed dynamic condition to a remote location whereby the profile of said surface and a dynamic condition at said surface may be simultaneously meansured.

2. The apparatus of claim 1 wherein said dynamic condition sensing means comprises:

temperature sensitive means mounted on said swing arm means for generating an electrical signal commensurate with the temperature in the vicinity of the surface.

3. The apparatus of claim 2 wherein said swing arm means comprises:

a rigid elongated swing arm pivotally connected to said gauge arm means adjacent the said first end thereof; and surface contacting means affixed to the first end of said swing arm, said contacting means permitting movement of said swing arm first end over the surface during motion of said gauge arm means.

4. The apparatus of claim 3 wherein said swing arm is pivotal transversely of the plane of movement of said gauge arm means and wherein said apparatus further comprises:

latch means for holding said swing arm in alignment with said gauge arm means during extension of said gauge arm means first end over said surface, said latch means being released to permit said contacting means to descent into contact the surface when said gauge arm means had been extended a predetermined distance; and means for returning said swing arm to the aligned and latched position as said gauge arm means is withdrawn from over the surface.

5. The apparatus of claim 4 wherein the surface of interest is defined by the charge in a furnace and wherein said dynamic condition sensing means comprises:

temperature sensitive means mounted on said swing arm for generating an electrical signal commensurate with the temperature in the vicinity of the surface.

6. The apparatus of claim 5 further comprising:

gas extraction means mounted on said swing arm; and means for transmitting gas from said extraction means to the exterior of the furnace.

7. The apparatus of claim 1 wherein said apparatus further comprises:

means for sensing the position of a point on said gauge arm means with respect to a reference point and for generating a signal commensurate with said sensed position; and means for sensing the angle between said swing arm means and said line during movement of said gauge arm means and for generating a signal commensurate with said angle whereby the contour of the surface of the furnace charge may be determined by combining the information provided by said position and angle signals simultaneously with the measurement of the charge surface temperature and sensing of gases adjacent the charge surface.

8. The apparatus of claim 7 wherein said means for sensing the angle between said swing arm means and said line comprises:

means for mechanically sensing the position of said swing arm means with respect to said gauge arm means and for generating a mechanical signal commensurate therewith;

means for converting said mechanical signal into an electrical signal commensurate with the measured angle; and means for transmitting said electrical signal commensurate with the measured angle to the exterior of the furnace.

9. The apparatus of claim 8 further comprising:

means positioned externally of the furnace and responsive to said signal commensurate with gauge arm means position and swing arm means angle for providing an indication of the furnace charging plane profile.

10. Apparatus for sensing conditions at the surface of a charge of material deposited on the hearth of a furnace, said furnace charge surface having a variable profile, the apparatus comprising:

gauge arm means; means supporting said gauge arm means for movement into the furnace along a line lying in a plane disposed above the surface of the furnace charge;

swing arm means pivotally attached to said gauge arm means, said swing arm means being rotatable relative to a plane disposed above the charge surface and containing said line, a first end of said swing arm means being capable of contacting the surface of the furnace charge;

means on said swing arm means for sensing a dynamic condition at the surface of the furnace charge; and means transmitting information commensurate with said sensed dynamic condition to the exterior of the furnace.

11. The apparatus of claim 10 wherein said dynamic condition sensing means comprises:

temperature sensitive means mounted on said swing arm means for generating an electrical signal commensurate with the temperature in the vicinity of the surface.

12. The apparatus of claim 11 further comprising:

gas extraction means mounted on said swing arm means, and means for transmitting gas from said extraction means to the exterior of the furnace.

13. A method for sensing static and dynamic conditions at the surface of the charge in a shaft furnace comprising the steps of:

inserting a trailing gauge into the furnace to a predetermined position, the trailing gauge including a horizontally extendable member having a gauge arm pivotally mounted to the end thereof disposed in the furnace;

causing the free end of the gauge arm to contact the surface of the furnace charge;

withdrawing the trailing gauge while maintaining contact between the free end of the gauge arm and the surface of the furnace charge;

measuring the amount of extension of the horizontally extendable member of the trailing gauge into the furnace during withdrawal;

simultaneously measuring the angle between the pivotal gauge arm and horizontal; and sensing a dynamic condition at the surface of the charge during withdrawal of the trailing gauge and transmitting a signal commensurate with the sensed condition to the exterior of the furnace through the gauge.

14. The method of claim 13 wherein the step of withdrawing the gauge comprises:

maintaining contact between the gauge portion and the surface until withdrawal is substantially completed; and completing withdrawal by raising the surface contacting gauge portion into alignment with the further gauge portion.

15. The method of claim 14 wherein the step of sensing a dynamic surface condition comprises:

measuring the temperature adjacent the surface during withdrawal.

16. The method of claim 14 wherein the step of sensing a dynamic surface condition comprises:

sampling the gas adjacent the surface during withdrawal.

17. The method of claim 15 further comprising: sampling the gas adjacent the surface during withdrawal.

18. The apparatus of claim 1 wherein the surface of interest is defined by a charge in a furnace and wherein said dynamic condition sensing means comprises:

gas extraction means mounted on said swing arm means, gas sampled by said extraction means being transmitted to the exterior of the surface by said information transmitting means.

19. The apparatus of claim 10 wherein said dynamic condition sensing means comprises:

gas extraction means mounted on said swing arm means.

* * * * *

UNITED STATES PATENT OFFICE
CERTIFICATE OF CORRECTION

PATENT NO. : 3,905,239
DATED : September 16, 1975
INVENTOR(S) : Edouard Legille

It is certified that error appears in the above-identified patent and that said Letters Patent are hereby corrected as shown below:

```
Column 4, line 22, "FIG. 2-7" should be --FIG. 2--
Column 4, line 26, "FIG. 2b" should be --FIG 3--
Column 6, line 49, (actually line 48) "as" should be --gas--
Column 8, line 26, "plan" should be --plane--
Column 8, line 28, "into" should be --onto--
Claim 1, line 14 (Column 8, line 66), before "arm" the word
          --swing-- was omitted
Claim 4, line 9 (Column 9, line 41), "descent" should be
          --descend--
Claim 4, line 10 (Column 9, line 42), "had" should be --has--

Claim 7, line 1 (Column 9, line 59), "1" should be --12--
Claim 9, line 3 (Column 10, line 23), "signal" should be
          --signals--
```

Signed and Sealed this sixteenth Day of December 1975

[SEAL]

Attest:

RUTH C. MASON
Attesting Officer

C. MARSHALL DANN
Commissioner of Patents and Trademarks